US009256628B2

(12) United States Patent
 Garcia

(10) Patent No.: US 9,256,628 B2
(45) Date of Patent: Feb. 9, 2016

(54) EFFICIENT LOGGING OF PROCESSING PEAKS IN CONTROL SYSTEMS

(71) Applicant: International Business Machines Corporation, Armonk, NY (US)

(72) Inventor: Enrique Q. Garcia, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 13/893,793

(22) Filed: May 14, 2013

(65) Prior Publication Data

US 2014/0344300 A1 Nov. 20, 2014

(51) Int. Cl.
 *G06F 7/00* (2006.01)
 *G06F 17/00* (2006.01)
 *G06F 17/30* (2006.01)

(52) U.S. Cl.
 CPC .............................. *G06F 17/30312* (2013.01)

(58) Field of Classification Search
 CPC .................... G06F 17/30539; G06F 17/30424
 See application file for complete search history.

(56) References Cited

U.S. PATENT DOCUMENTS

| 5,923,099 A | 7/1999 | Bilir |
| 5,946,375 A * | 8/1999 | Pattison et al. .......... 379/112.01 |
| 6,973,044 B1 | 12/2005 | Barach |
| 7,143,317 B2 | 11/2006 | Lyle et al. |
| 7,457,870 B1 * | 11/2008 | Lownsbrough et al. ...... 709/224 |
| 2004/0125776 A1 * | 7/2004 | Haugli et al. ................. 370/338 |
| 2005/0229037 A1 | 10/2005 | Egan et al. |
| 2006/0282301 A1 * | 12/2006 | Olson ............................... 705/9 |
| 2007/0168088 A1 | 7/2007 | Ewing et al. |
| 2008/0164761 A1 | 7/2008 | O'Bryant et al. |
| 2012/0323396 A1 | 12/2012 | Shelton et al. |
| 2013/0033109 A1 | 2/2013 | Schultz et al. |
| 2014/0025770 A1 * | 1/2014 | Warfield et al. ............... 709/213 |

FOREIGN PATENT DOCUMENTS

| CN | 202150718 U | 2/2012 |
| JP | 2010154622 A | 7/2010 |

OTHER PUBLICATIONS

"Minuteman® Endeavor™ Series On-line Uninterruptible Power Supply", Para System, Inc., 2007, www.minutemanups.com.
iSeries, "Plan for controlled system shutdown", IBM, International Business Machines Corporation, 1996, 2002, pp. 1-24.
System i, "Systems management Controlling system shutdown using a power-handling program", Version 6, Release 1, IBM, International Business Machiens Corporation, 1998, 2008, pp. 1-22.

* cited by examiner

*Primary Examiner* — Susan Chen
(74) *Attorney, Agent, or Firm* — David Zwick; Randall J. Bluestone

(57) ABSTRACT

A method for efficient logging in a control system is provided. A temporary history record corresponding to a message transaction placed onto a message queue data structure is generated. A total processing time for the received message transaction is determined. The total processing time is compared with a previously determined peak processing time value. In response to determining that the total processing time exceeds the previously determined peak processing time value, the temporary history record corresponding to the received message transaction is stored in an event log.

2 Claims, 5 Drawing Sheets

EFFICIENT LOGGING OF PROCESSING PEAKS IN CONTROL SYSTEMS

BACKGROUND

The present invention relates generally to control systems, and more specifically to control systems that use event logs for diagnostic purposes.

Because of the possibility of power outages, many businesses, data centers and other entities use battery backup systems to ensure that electrical power will be available for critical items even if a utility outage occurs. One technology that has been developed to avoid power outages is the Uninterruptible Power Supplies (UPS). A UPS typically includes a battery providing reserve electrical power if a main source of electrical power fails. Thus, if utility power fails, electric services can continue as long as the UPS device provides sufficient battery power to supply the needed electricity.

A variety of different techniques have been used to improve reliability and/or capacity of UPS systems. The techniques include a serial redundant arrangement. A typical serial redundant arrangement involves, for example, first and second UPSs connected in a serial fashion wherein, in a first mode of operation, the first UPS is bypassed while the second UPS is serving the load and, in a second mode of operation, the second UPS is bypassed while the first UPS serves the load, such that the first and second UPSs may serve as standby backups for one another.

Typically, a serial redundant arrangement of UPS systems includes an embedded UPS controller configured to control UPSs. The UPS controller typically compiles all detected errors and other significant events in an event log. When the UPS system is serviced, for example, after some problem or failure, the event log can be examined to help determine the cause of the problem or failure. One standard form of event log is a "circular" event log. Once the event log is full, new events overwrite the oldest events in the log. This does not work well for events that trigger a cascade of error events. If there are enough follow-on events, the trigger event(s) could be discarded and unavailable for diagnoses. The likelihood of unavailable events of interest can be reduced by using event logs with greater capacity. However, embedded UPS controller's integrated-circuit real estate is limited so that it is not practical to use an event log that is large enough to store all possible events of interest. These utilities do not provide a flexible way to capture and retain events of greatest interest at appropriate granularity level.

SUMMARY

In one illustrative embodiment, a method for efficient logging in a control system is provided. The method comprises generating a temporary history record corresponding to a message transaction placed onto a message queue data structure. The method further comprises, determining a total processing time for the received message transaction. The method further comprises comparing the total processing time with a previously determined peak processing time value. The method further comprises storing the temporary history record corresponding to the received transaction in an event log, in response to determining that the total processing time exceeds the previously determined peak processing time value.

In another illustrative embodiment, a computer program product for efficient logging in a control system is provided. The computer program product comprises one or more computer-readable storage devices and a plurality of program instructions stored on at least one of the one or more computer-readable storage devices. The plurality of program instructions comprises program instructions to generate a temporary history record corresponding to a message transaction placed onto a message queue data structure. The plurality of program instructions further comprises program instructions to determine a total processing time for the message transaction. The plurality of program instructions further comprises program instructions to compare the total processing time with a peak processing time value. The plurality of program instructions further comprises program instructions to store the temporary history record corresponding to the message transaction in an event log, in response to determining that the total processing time exceeds the peak processing time value.

In yet another illustrative embodiment, a computer system for efficient logging in a control system is provided. The computer system comprises one or more processors, one or more computer-readable storage devices, and a plurality of program instructions stored on at least one of the one or more storage devices for execution by at least one of the one or more processors. The plurality of program instructions comprises program instructions to generate a temporary history record corresponding to a message transaction placed onto a message queue data structure. The plurality of program instructions further comprises program instructions to determine a total processing time for the message transaction. The plurality of program instructions further comprises program instructions to compare the total processing time with a peak processing time value. The plurality of program instructions further comprises program instructions to store the temporary history record corresponding to the message transaction in an event log, in response to determining that the total processing time exceeds the peak processing time value.

DETAILED DESCRIPTION

Embodiments of the present invention will now be described with reference to the figures. Embodiments of the present invention apply equally to all forms of control systems that capture data events internally in an event log structure having limited logging capability. However, focus is directed to uninterruptable power supply (UPS) control systems by means of example and explanation in the description of embodiments of the present invention.

The method of efficient logging in a control system described herein provides flexibility, by maintaining temporary history data in a volatile memory and by logging only events of greatest interest in an event log structure.

Figure 1:
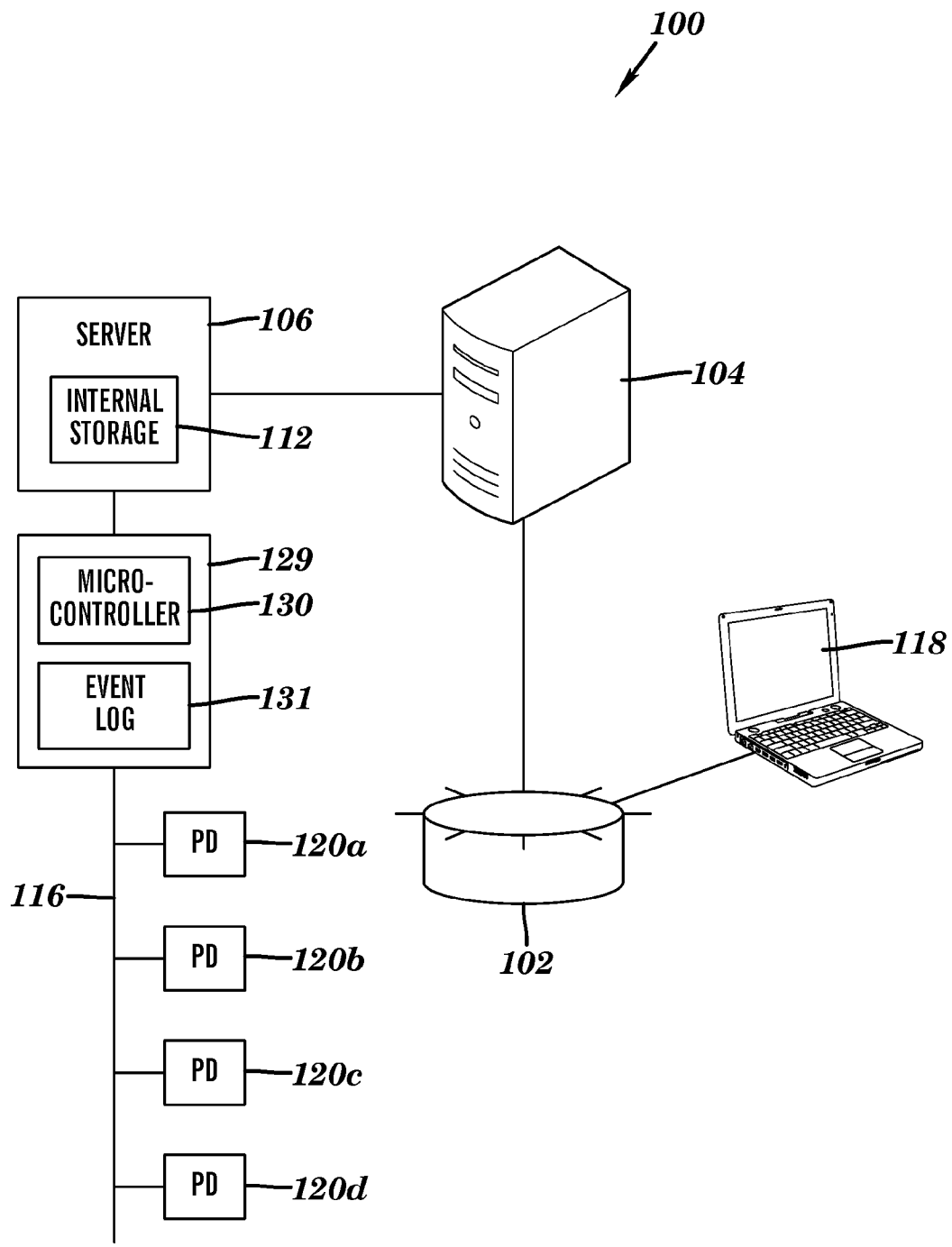
FIG. 1 is a conceptual block diagram of a sample computer environment in which an embodiment of the present invention can be implemented.

FIG. 1 is a conceptual block diagram of a sample computer environment in which an embodiment of the present invention can be implemented. FIG. 1 is an illustration of one implementation and is not intended to imply any limitation with regard to the environments in which different embodiments may be implemented. Many modifications to the depicted environments may be made.

In one embodiment network 102 can be the Internet which uses the TCP/IP suite of protocols. Network 102 may also comprise a number of different types of networks, such as an intranet, a local area network (LAN), a wide area network (WAN), wireless local area network (WLAN), synchronous optical network (SONET), and the like.

Network 102 provides communication links between various devices and computers. Network 102 may include connections, such as wire, wireless communication links, fiber optic cables, or any other connection technology known in the art. Network 102 may include additional server computers, client computers, displays and other devices not shown.

Exemplary computer environment 100 comprises server computer 104 coupled to client computer 118 via network 102. Server computer 104 may be a mainframe computer, a workstation, a personal computer, and the like. Server computer 104 may be configured to communicate with a plurality of peripheral devices 120a-120d via server 106. As will be discussed with reference to FIG. 6, server computer 104 includes internal components 800a and external components 900a, server computer 106 includes internal components 800b and external components 900b, and client computer 118 includes internal components 800c and external components 900c. Internal components 800a and 800b of sever computers 104 and 106 include, but not limited to, one or more processors 820 (shown in FIG. 6).

Server computer 106 is configured to control and monitor a sub-system of peripheral devices (PDs) 120a-120d. In FIG. 1, an array including four PDs 120a, 120b, 120c, 120d is shown for illustration, but it should be understood that the PD array may include a greater or lesser number of PDs. Exemplary peripheral devices may include, for example, but not limited to DVD players, CD ROMs, digital cameras, printers, scanners, monitors, and the like. In an embodiment, the sub-system of peripheral devices may include a power-supply sub-system for server 104. Each of PDs 120a-120d may represent a UPS unit. An embedded controller 129 coupled to server 106 controls the overall operation of PDs 120a-120d via, for example, microcontroller program 130. In an embodiment, microcontroller program 130 may be, for example, a computer program or program component configured to control a plurality of PDs 120a-120d. Thus, microcontroller program 130 may, for example, manage the transfer of data to and from the PD array.

In an embodiment, microcontroller program 130 may comprise program instructions stored on one or more computer-readable storage devices, which may include internal storage 112 on server computer 106. Microcontroller program 130 may communicate with PDs 120a-120d via a bus 116.

Figure 2:
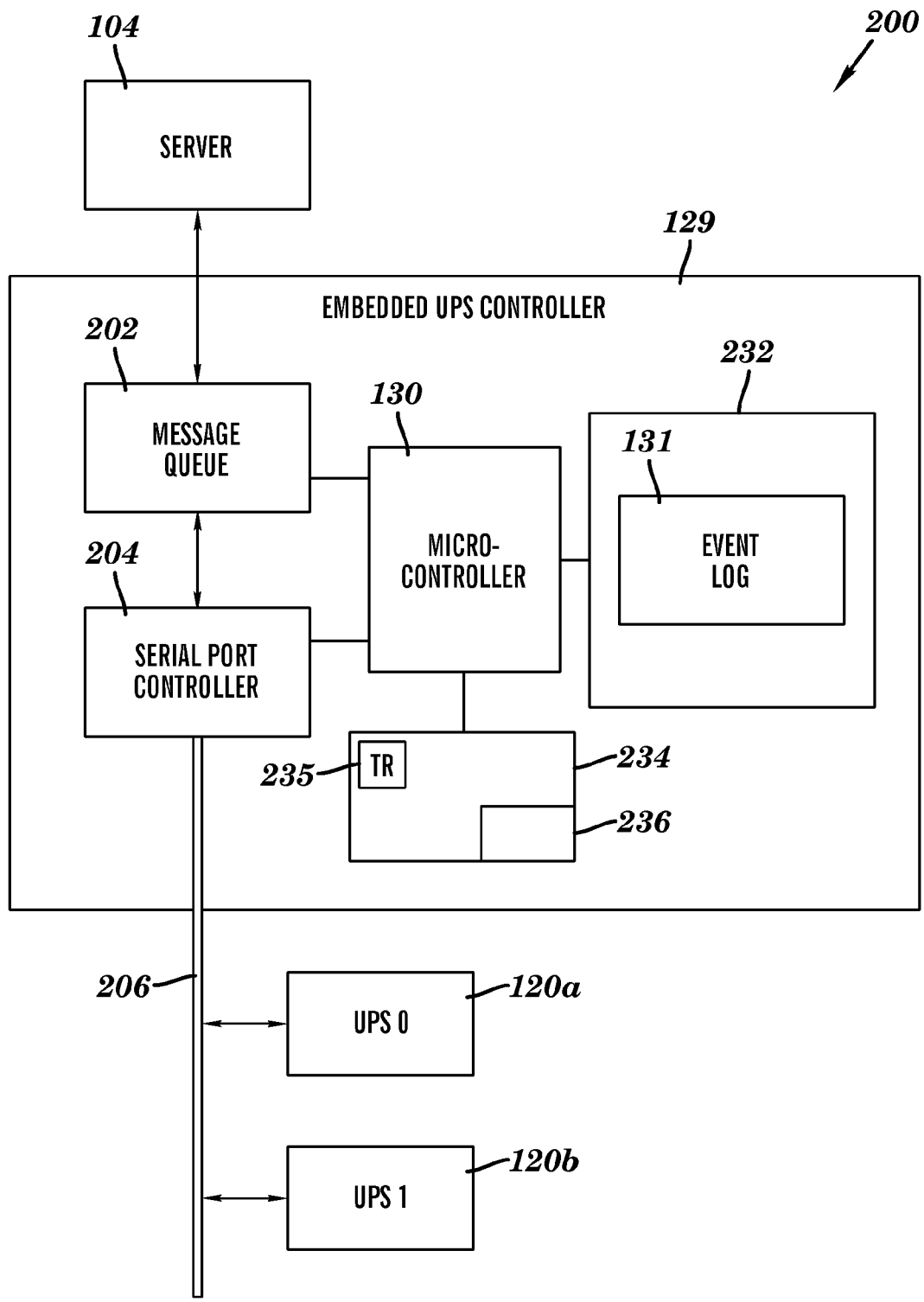
FIG. 2 illustrates operation of the embedded controller illustrated in FIG. 1 in more detail, in accordance with an embodiment of the present invention.

In an embodiment, microcontroller program 130 may be configured to maintain an event log 131, as discussed in conjunction with FIG. 2. Microcontroller program 130 and event log 131 may be localized on server 106 and/or distributed between two or more servers.

Client computer 118 also connects to network 102. Client computer 118 may be, for example, a mobile device, telephone, television receiver, cell phone, personal digital assistant, netbook, laptop computer, tablet computer, desktop computer, and/or any type of computing devices capable of executing software in accordance with the embodiments described herein. Client computer 118 may contain a user interface (UI). UI can be, for example, graphical user interface (GUI) or web user interfaces (WUI). Client computer 118 may receive, process, display and/or otherwise exchange data with server 104.

FIG. 2 illustrates operation of the embedded controller illustrated in FIG. 1 in more detail, in accordance with an embodiment of the present invention. The same reference numbers in different drawings identify the same or similar elements. Embodiments of the present invention apply equally to all forms of control systems that capture data events internally in an event log structure having limited logging capability. However, in FIG. 2, focus is directed to a power supply system (i.e. UPS control system) 200 by means of example and explanation in the description of embodiments of the present invention.

Power supply system 200 depicted in FIG. 2 includes an embedded UPS controller 129 that controls and monitors the overall operation of power supply system 200. Embedded UPS controller 129 is operated by microcontroller program 130 that implements the overall purpose of system 200. In an embodiment of the present invention, embedded UPS controller 129 may be configured to communicate with server 104 via one or more message queues 202. Message queuing is a well-known concept in computer programming, and refers to a messaging model where messages from one or more senders (i.e. server 104) are put onto a queue at a messaging service provider (embedded UPS controller 129) and then dispatched from the queue to various target recipients (UPS units 120a, 120b). Message queue 202 provides asynchronous communication between a message sender and recipient, whereby the sender can send the message without regard to whether the recipient is currently able to receive the message: the message remains stored in message queue 202 until such time as it is dispatched to the recipient by microcontroller program 130. Messages placed onto message queue 202 are stored in a queue data structure until microcontroller program 130 is ready to process them. Transaction processing semantics may be used by embedded UPS controller 129 to ensure that a message is not permanently removed from message queue 202 until the recipient has successfully received it. In an embodiment of the present invention, a typical first-in, first-out, or "FIFO", queuing approach for message delivery may be implemented. As is well-known, this comprises removing messages from the message queue 202 in the same order in which they were originally placed on message queue 202. However, various embodiments of the present invention are not limited to a FIFO message queuing approach.

As shown in FIG. 2, power supply system 200 has two UPS devices a first UPS device 120a and a second UPS device 120b. In an embodiment of the present invention, the first UPS device 120a receives its power from the AC power line #1 (not shown) while the second UPS device 120b receives its power from the AC power line #2 (not shown). While FIG. 2 shows only two UPS devices, some systems may have only one UPS device while others may have three or more, possibly many more. The overall goal of power supply system 200 is to ensure that a failure of one AC power line does not cause both power supplies (UPS devices) to fail (thus preserving their redundant status).

In power supply system 200, microcontroller program 130 can send power microcode commands embedded into a data transaction via a serial bus 206 to each of the first 120a and second 120b UPS devices in order to control operation of those devices. Also, each UPS device 120a and 120b has a discrete IP address or other identifier, such as a serial number, that uniquely identifies the UPS. Each of the UPS devices 120a and 120b also includes the capability to send that identifier to microcontroller program 130 along with information related to the capability of that UPS device to perform its tasks, such as its ability to reliably supply power and for how long that power can be supplied. Additional information also can be sent, such as surge capacity, whether a UPS device can decrease/increase output voltage to aid in the determining of AC wiring map and possibly warnings as available power is depleted. Given the foregoing information, microcontroller program 130 can determine if each of the UPS devices 120a, 120b is suitable for performing its tasks.

In one embodiment of the present invention, a serial port controller 204 may be provided in embedded UPS controller 129. Serial port controller 204 may include a state machine that can access protocol information regarding plural UPS devices 120a, 120b operationally coupled to serial port controller 204 via serial bus 206. In an embodiment of the present invention, serial port controller 204 may include a first register (not shown) that can hold address information of the plurality of UPS devices 120a, 120b. In addition, serial port controller 204 may include logic for enabling the plurality of UPS devices 120a, 120b for either a write or read request. Serial port controller 204 may also include a second register (not shown) for holding write data information for the plurality of UPS devices 120a, 120b. Furthermore, serial port controller 204 may include a third register (not shown) for holding read data information for the plurality of UPS devices 120a, 120b.

Thus, serial port controller 204 enables embedded UPS controller 129 to communicate with a plurality of serial port devices (UPS devices 120a and 120b). At least in some embodiments, serial port controller 204 can be implemented by a Complex Programmable Logic Device (CPLD) or Field Programmable Gate Array (FPGA). FPGAs and CPLDs are integrated circuits that can be programmed by users to perform customized logic functions. In an embodiment of the present invention, these integrated circuits can be programmed to provide a serial bus interface.

According to an embodiment of the present invention, a half-duplex system, a well-known type of data communication system, may be used to implement data communication between serial port controller 204 and a plurality of UPS devices 120a and 120b. A half-duplex system is one in which data can be transmitted only in one direction on serial bus 206 at any given time. In other words, data cannot be transmitted in opposite directions on bus 206 at the same time.

For example, serial port controller 204 may transmit data to first UPS device 120a or second UPS device 120b. If no response is received within a certain period of time, serial port controller 204 may assume the data was not received and may take an appropriate action. Serial port controller 204 may, for example, re-transmit the data or may send an error message to microcontroller program 130. Since in this data communication system serial port controller 204 initiates all communications with the plurality of UPS devices 120a and 120b, only serial port controller 204 or one of the UPS devices 120a, 120b should transmit at any given time. There should be no collision on serial bus 206 between controller-transmitted data and UPS-transmitted data.

In one embodiment of the present invention, also coupled to the microcontroller program 130 is a volatile memory. The volatile memory may be a static random-access memory (SRAM) or a dynamic random-access memory (DRAM) chip that is well known in the art and that is capable of retaining data when embedded UPS controller 129 is powered up. In various embodiments, any appropriate number and type of RAM modules may be used. In the embodiment illustrated in FIG. 2, embedded UPS controller 129 may include two different SRAM modules, such as first SRAM module 232 and second SRAM module 234. In this embodiment, the entire first SRAM module 232 can be designated as logging region.

As mentioned above, microcontroller program 130 may be configured to maintain all significant events in event log 131, which may be retained in first SRAM module 232 of the volatile memory. In an embodiment of the present invention, event log 131 shall contain at least some details about data communication between microcontroller program 130 and the plurality of UPS devices 120a, 120b. When power supply system 200 is serviced, for example, after some problem or failure, event log can 131 be examined to help determine the cause of the problem or failure. One conventional form of event log 131 is a "circular" event log. Once event log 131 is full, new events overwrite the oldest events in event log 131. This does not work well for events that trigger a cascade of error events. If there are enough follow-on events, the trigger event(s) could be discarded and unavailable for diagnoses. The likelihood of unavailable events of interest can be reduced by using event logs with greater capacity. However, embedded UPS controller's 129 integrated-circuit real estate is limited so that it is not practical to use an event log that is large enough to store all possible events of interest.

In an embodiment of the present invention illustrated in FIG. 2, embedded UPS controller 129 may also include second SRAM module 234. Second SRAM module 234 can be used for general purpose RAM. In addition, second SRAM module 234 may contain for example, a temporary register 235. In an embodiment of the present invention, temporary register 235 may provide a temporary storage place for a peak processing value calculated by microcontroller program 130, as described below. In addition to the temporary register 235, second SRAM module 234 may also include a portion 236 for storing temporary history data shown in FIG. 4. Of course, the SRAM may be any suitable size and partitioned in any desirable manner. For example, in an alternate embodiment, a single RAM module (such as SRAM or DRAM) may be used for both event logging and general purpose functions. A method of efficient logging described herein provides flexibility, by maintaining temporary history data in volatile memory and by logging only events of greatest interest in event log structure 131, as described below in conjunction with FIG. 5.

Figure 3:
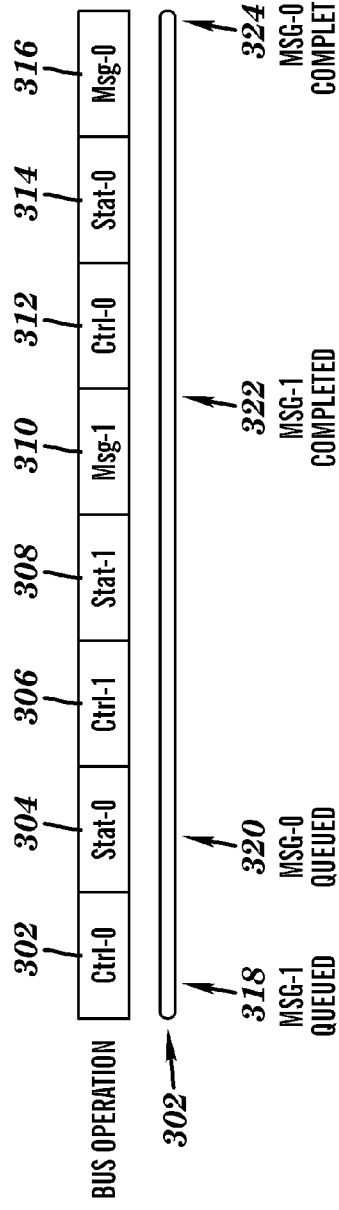
FIG. 3 is an exemplary timeline of transactions transmitted over a serial bus illustrated in FIG. 1, in accordance with an embodiment of the present invention.

FIG. 3 is an exemplary timeline of transactions over the serial bus illustrated in FIG. 1, in accordance with an embodiment of the present invention. In an embodiment of the present invention, microcontroller program 130 is configured to provide the plurality of transactions to the serial bus 206 (via serial port controller 204) in an order that is based at least partially on transaction types. FIG. 3 shows three types of transactions that communicate data, control and status information. First type of transactions may include control signals, such as Ctrl-0 302, Ctrl-1 306, and Ctrl-0 312, wherein 0 indicates that the corresponding transaction (e.g. Ctrl-0 302) is addressed to first UPS device 120a and wherein 1 indicates that the corresponding transactions (e.g. Ctrl-1 306) is addressed to second UPS device 120b. These control signals may be used by microcontroller program 130 to implement all the control functions for an on-line UPS, which may include power-on startup control, input stage power factor control, battery charging and boosting control, shutdown control, and the like. Second type of transactions may include status request signals that microcontroller program 130 sends to each UPS device periodically, such as Stat-0 304, Stat-1 308, Stat-0 314, and the like. According to an embodiment of the present invention, in response to receiving such status request signals, each UPS device 120a, 120b may respond with transmitting status data back to microcontroller program 130. Third type of transactions may include messages contained in message queue 202 that are addressed to one of the plurality of UPS devices, such as first UPS device 120a and second UPS device 120b (e.g., Msg-0 316 and Msg-1 310, respectively). This type of transactions may be used, for example, to request information different from the typical status information. For example, server 104 may send message transactions to request information about the system, such as, for example vital product data. In an embodiment of the present invention, microcontroller program 130 may be configured to periodically send control and status request transactions to a plurality of UPS devices and may be configured to send messages enqued in message queue 202. At least in some embodiments of the present invention, microcontroller program 130 may send these transactions in an interleaved manner.

Referring back to an example illustrated in FIG. 3, microcontroller program 130 receives first message, for example MSG-1, addressed to second UPS device 120b at time 318 while Ctrl-0 transaction 302 is being transmitted via serial bus 206. This received message will wait in message queue data structure 202 for processing, until microcontroller program 130 transmits control and status request transactions to second UPS device 120b. Upon the completion of Ctrl-0 transaction 302, microcontroller program 310 may start sending Stat-0 request transaction 304. Approximately half way through that transmission microcontroller program 130 receives another message, for example MSG-0, which is addressed to another device—first UPS device 120a. Again, microcontroller program 130 may place the received message MSG-0 onto message queue data structure 202 until it is ready for processing that message. According to an embodiment described herein, microcontroller program 130 may be configured to implement a conventional FIFO approach. This means that messages will be processed in the order in which they were received. Thus, microcontroller program 130 should process message MSG-1 prior to processing message MSG-0.

As shown in FIG. 3, microcontroller program 130 may proceed with processing control transaction 306 and status transaction 308 addressed to second UPS device 120b followed by a transmission of message MSG-1 (transaction 310). The processing of message MSG-1 completes at time 322. A time period between the message arrival time 318 and message processing completion time 322 represents a total processing time for message MSG-1. At this point in time message MSG-0 moves to the head of message queue data structure 202. As shown in FIG. 3, microcontroller program 130 may next send a sequence of transactions addressed to first UPS device 120a. More specifically, microcontroller program 130 may send the following transactions—Ctrl-0 transaction 312, Stat-0 transaction 314 and Msg-0 transaction 316. The pre-configured transaction transmission scheme is explained in the pseudo-code below described in conjunction with FIG. 5. As depicted in FIG. 3, microcontroller program 130 completes the transmission of message MSG-0 (transaction 316) at time 324. Thus, a time period between the message arrival time 320 and message processing completion time 324 represents a total processing time for message MSG-0. Note that timeline 302 is provided for purposes of illustration only.

Figure 4:
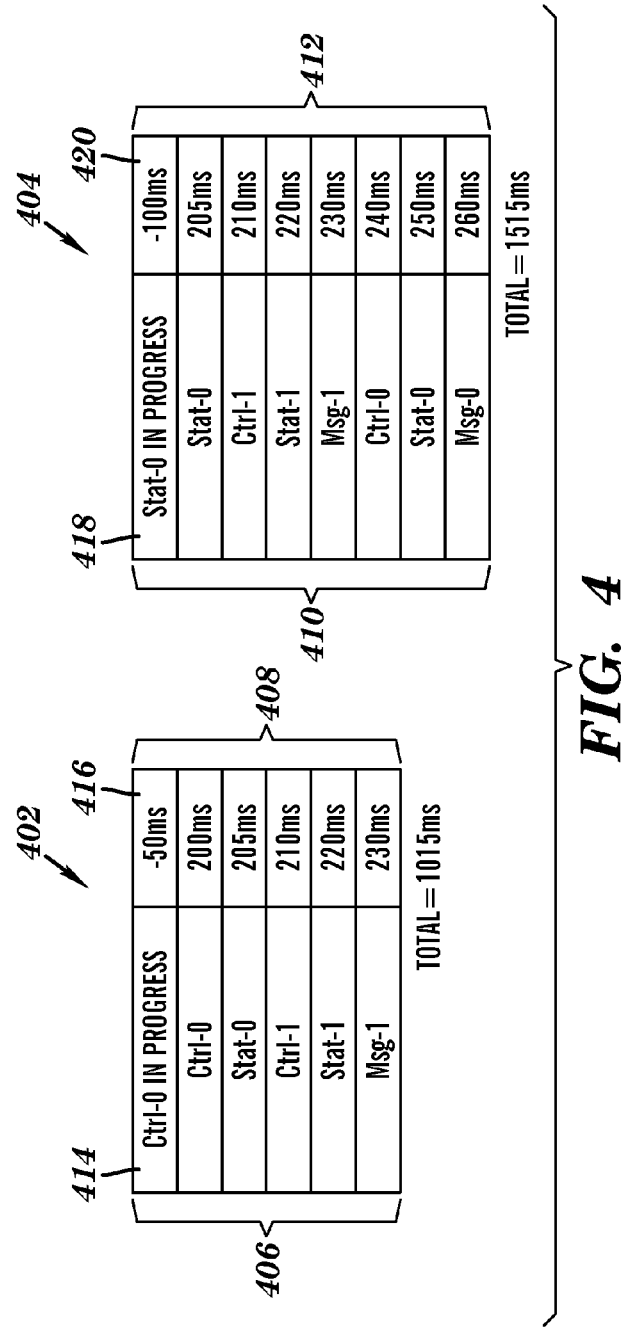
FIG. 4 is a diagram illustrating temporary history information recorded by a microcontroller program, in response to processing transactions illustrated in FIG. 3, according to an embodiment of the present invention.

FIG. 4 is a diagram illustrating temporary history information recorded by microcontroller program 130, in response to processing exemplary transactions illustrated in FIG. 3, according to an embodiment of the present invention. First temporary history record 402 is associated with the first message, MSG-1, received by microcontroller program 130 at time 318, while second temporary history record 404 is associated with the second message, MSG-0, received by microcontroller program 130 at time 320. As shown in FIG. 4, each of the temporary history records may provide information about a sequence of transactions that were processed between a corresponding message arrival time and a corresponding message processing completion time, as described below. In an embodiment of the present invention, the first (402) and second (404) temporary history records may be stored in portion 236 of second SRAM module 234 contained within embedded UPS Controller 129 (shown in FIG. 2).

According an embodiment of the present invention, an exemplary temporary history record may include a plurality of entries consisting of several fields. For example, first field 406 of each entry may store information identifying processed transactions, while the second field 408 of each temporary history entry may store transaction processing times associated with each transaction stored in the first field 406. As depicted in FIG. 4, first temporary history record 402 only contains information corresponding to a sequence of transactions that were processed between first message's arrival time 318 and first message's transmission completion time 322. Similarly, second temporary history record 404 only contains information corresponding to a sequence of transactions that were processed between second message's arrival time 320 and second message's transmission completion time 324.

According to an embodiment of the present invention, first entry (row) in each record may be used by microcontroller program 130 to store information related to the operation (i.e. transaction) in progress at the message arrival time. For example, first entry in first temporary history record 402 indicates that at time 318 (first message's arrival time), Ctrl-0 transaction 302 was being transmitted on serial bus 206 as shown in field 414. Furthermore, the first entry also indicates that elapsed processing time of transaction Ctrl-0 302 at time 318 was equal to "−50 ms". It should be noted that elapsed processing time for the transaction in progress may be stored as a negative value (see field) 416. Similarly, first entry in second temporary history record 404 indicates that at time 320 (second message's arrival time), Stat-0 transaction 304 was being transmitted on serial bus 206 as shown in field 418. Accordingly, elapsed processing time for that entry is stored as a negative value as well, shown in field 420 as "−100 ms".

According to an embodiment of the present invention, microcontroller program 130 may use the temporary history records for determining total processing times for a corresponding message. For example, microcontroller program 130 may add all entries (transaction processing time values) in second field 408 (including a negative value 416) of the first temporary history record 402 in order to determine that the total processing time for the first message is equal to 1015 ms. Likewise, microcontroller program 130 may add all entries in second field 412 of second temporary history record 404 in order to determine that the total processing time for the second message is equal to 1515 ms.

Figure 5:
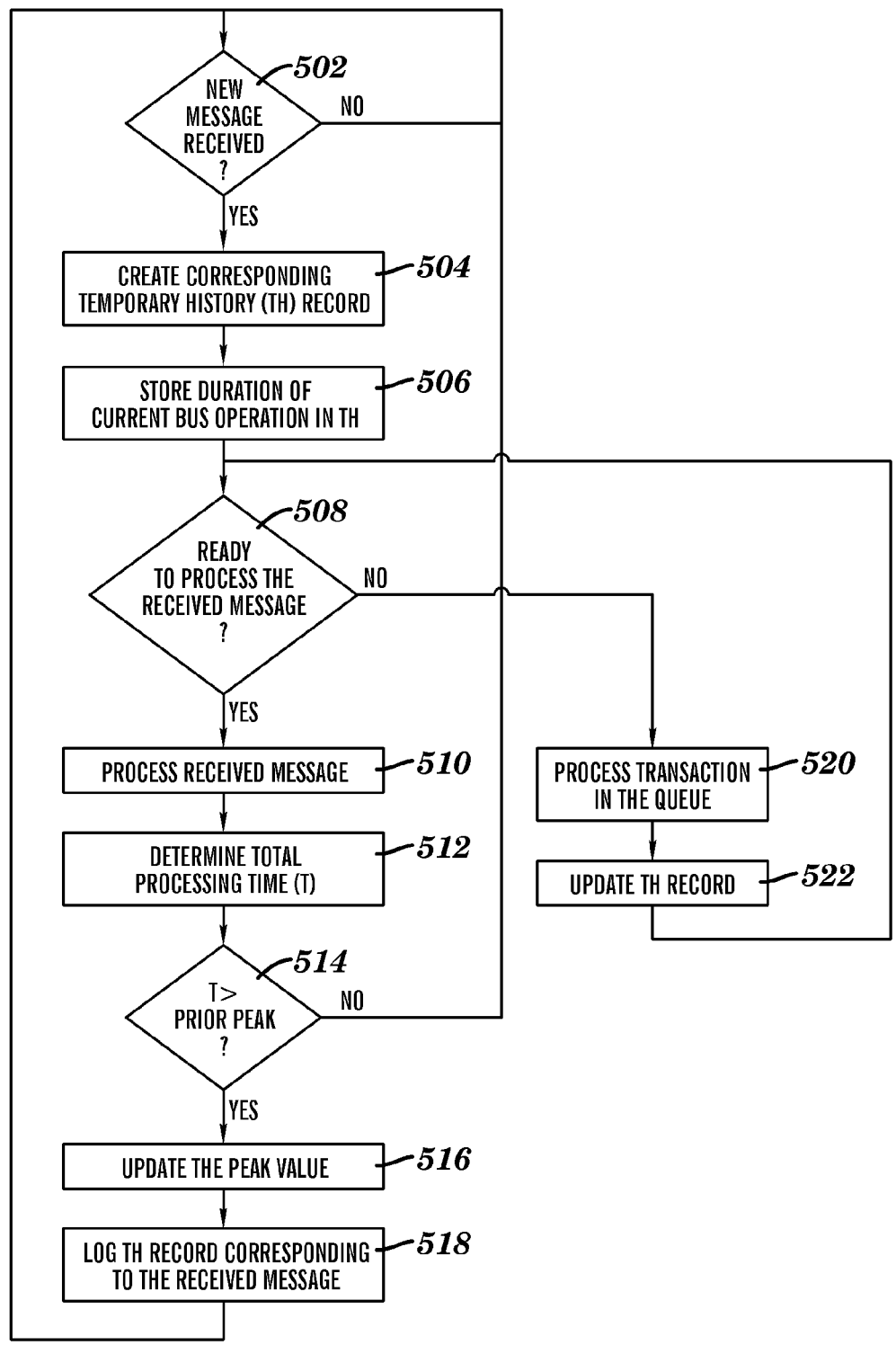
FIG. 5 illustrates in more detail steps performed by the microcontroller program illustrated in FIG. 1 for efficient logging of processed transactions, according to one embodiment of the present invention.

FIG. 5 illustrates in more detail steps performed by the microcontroller program for efficient logging of processed transactions, according to one embodiment of the present invention. At 502, microcontroller program 130 periodically analyzes message queue data structure 202 to determine whether any new messages have been placed onto message queue 202. If microcontroller program 130 determines that no new messages have been received (decision 502, no branch), microcontroller program 130 may check message queue 202 again after a predetermined period of time. In an embodiment, this predetermined period of time may range from approximately 1 ms to approximately 20 ms. If microcontroller program 130 determines that a new message has been received in message queue 202 (decision 502, yes branch), microcontroller program 130, at 504, may generate a temporary history record corresponding to the newly received message. Referring back to FIGS. 3 and 4, by way of example and not limitation, when a first message is received at time 318, microcontroller program 130 may generate first temporary history record 402. Similarly, microcontroller program 130 may generate second temporary history record 404 at time 320, in response to determining that the second message has been placed onto message queue 202. At 506, microcontroller program 130 may store information related to the operation (i.e. transaction) in progress at the message arrival time. For example, at time 318 microcontroller program 130 may update the first row of first temporary history record 402 to indicate that the processing of the Ctrl-0 transaction 302 has been in progress for approximately 50 ms (as shown in the fields 414 and 416 of FIG. 4). Likewise, at time 320, microcontroller program 130 may update the first row of second temporary history record 404 to indicate that the processing of Stat-0 transaction 304 has been in progress for approximately 100 ms (as shown in the fields 418 and 420 of FIG. 4).

At 508, microcontroller program 130 may determine whether it is ready to process (transmit) the newly received message. As previously indicated, microcontroller program 130 may be configured to send transactions to a plurality of UPS devices, such as first UPS device 120a and second UPS device 120b, based on a predetermined scheme. For example, in an embodiment of the present invention, microcontroller program 130 may be configured to communicate separately and sequentially with each of the plurality of UPS devices by continuously transmitting transactions according to the following pseudo-code:

For (device_num=1; device_num<=max_num_of_devices; device_num+1)
      Transmit control transaction [device_num];
      Transmit status request transaction [device_num];
      If (message addressed to device_num is at the top of the message queue) then
      Transmit message transaction [device_num]

wherein max_num_of devices represents a total number of devices in the power supply system 200. Therefore, at 508, microcontroller program 130 may determine whether the message transaction corresponding to the newly received message may be processed next based on the order shown in the above pseudo-code and based on the analysis of message queue 202. If microcontroller program 130 determines that it is not ready to process the corresponding message transaction (decision 508, no branch) then, at 520, microcontroller program 130 may send next transaction in the predetermined order. At 522, microcontroller program 130 may update a temporary history record with information corresponding to the transaction processed at 520. For example, referring back to FIGS. 3 and 4, microcontroller program 130 may store information related to each transaction processed prior to Msg-1 transaction 310 in first temporary history record 402.

Upon updating the corresponding temporary history record, microcontroller program 130 may return back to 508.

If microcontroller program 130 determines that it is ready to process the corresponding message transaction (decision 508, yes branch) then, at 510, microcontroller program 130 may process the received message transaction and may update the corresponding temporary history record accordingly. At 512, microcontroller program 130 may determine the total processing time for the newly processed message transaction. According to an embodiment of the present invention, microcontroller program 130 may add all entries (transaction processing times) in the second field 408 of first temporary history record 402 in order to determine the total processing time for the first message. Likewise, microcontroller program 130 may add all entries in the second field 412 of second temporary history record 404 in order to determine the total processing time for the second message. In an embodiment of the present invention, microcontroller program 130 may utilize temporary register 235 (shown in FIG. 2) to store the measured peak processing time. Note that the very first calculation of the total processing time generates the first peak value by default. Thus, at 514, microcontroller program 130 may compare the total processing time calculated at 512 with the previous peak time value stored in temporary register 235. If microcontroller program 130 determines that the total processing time is less than the previous peak processing time (decision 514, no branch) then microcontroller program 130 does not write anything to event log 131 and may return back to 502. However, if microcontroller program 130 determines that the total processing time is greater than the previous peak processing time (decision 514, yes branch) then microcontroller program 130, at 516, may replace the previous peak processing time value stored in temporary register 235 with the total processing time calculated at 512. For example, if microcontroller program 130 performs the comparison in decision block 514 at time 324, when it completes processing of second message transaction 316, the value corresponding to the previous peak time stored in temporary register 235 is equal to 1015 ms. Based on the example shown in FIG. 4, at 512, microcontroller program 130 had determined the total processing time for the second message to be equal to 1515 ms. Since the newly calculated total processing time is greater than the previous peak value, the newly calculated value becomes a new peak value and the processing information stored in second temporary history record 404 becomes a new "worst case" scenario as described below.

At 518, microcontroller program 130 may send the corresponding temporary history record to event log 131. A key point regarding this approach is that the decision to log a temporary history record is made by microcontroller program 130 only when a peak is detected. In other words, microcontroller program 130 only logs "worst case" scenario. This results in a minimum utilization of the limited logging capability in embedded UPS controller 129. As will be appreciated by one skilled in the art, aspects of the present invention provide an improved event log that better uses limited capacity to retain events of greatest interest.

Figure 6:
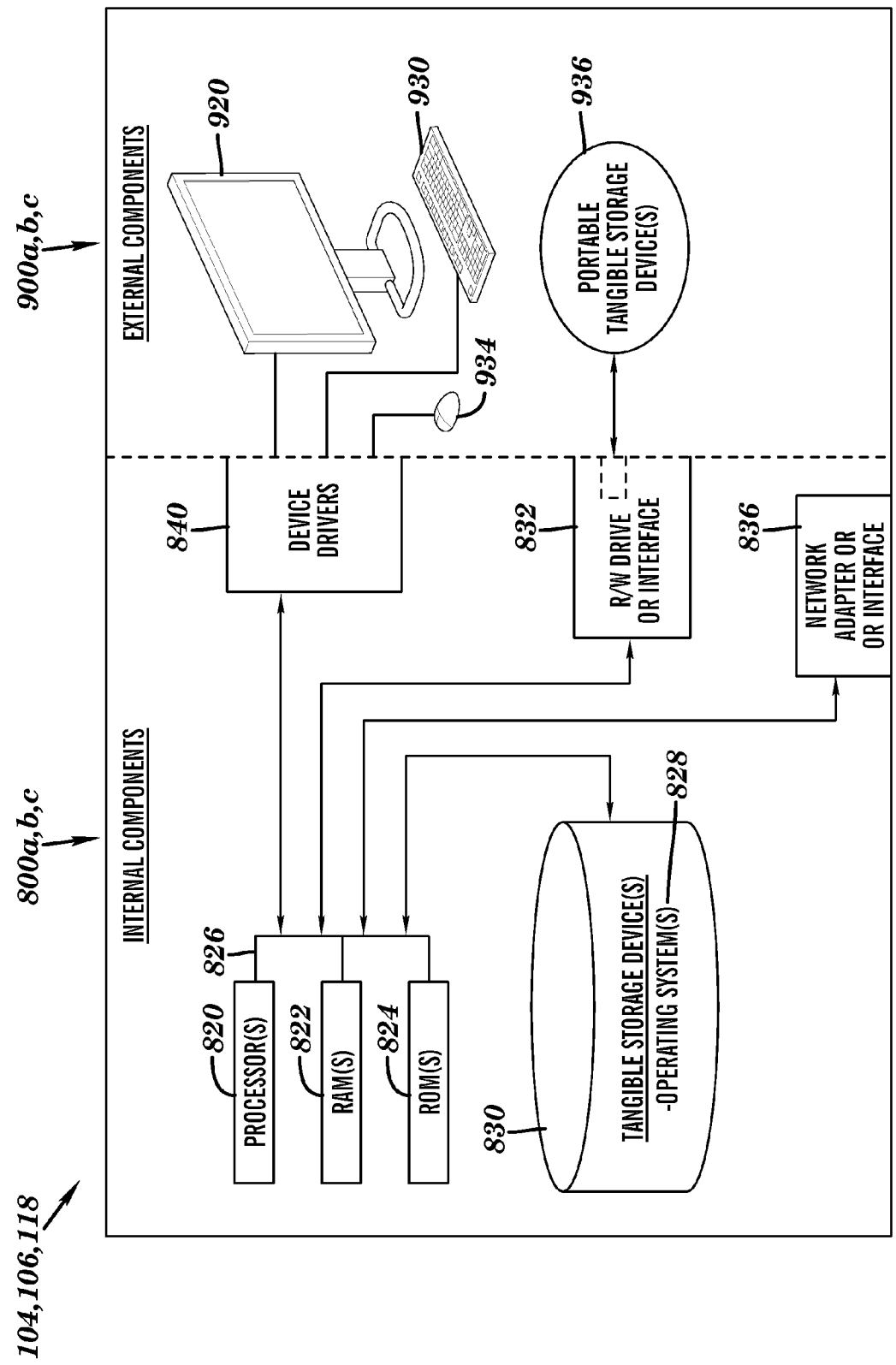
FIG. 6 is a block diagram of internal and external components of each of the computers of FIG. 1.

FIG. 6 is a block diagram of internal and external components of each of the computers of FIG. 1. Computers 104, 106, and 118 include respective sets of internal components 800a, b, c and external components 900a, b, c. Each of the sets of internal components 800a, b, c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and microcontroller program 130 are stored on one or more of the computer-readable tangible storage devices 830 for execution by one or more of the processors 820 via one or more of the RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a,b, c* also includes a R/W drive or interface 832 to read from and write to one or more portable computer-readable tangible storage devices 828 such as a CD-ROM, DVD, memory stick, magnetic tape, magnetic disk, optical disk or semiconductor storage device. Embedded controller 129, which includes various components such as microcontroller program 130, can be stored on one or more of the portable computer-readable tangible storage devices 936, read via R/W drive or interface 832 and loaded into one or more computer-readable tangible storage devices 830.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the large computer server, partly on the large computer server, as a stand-alone software package, partly on the large computer server and partly on a remote computer or entirely on the remote computer or server. In the latter scenario, the remote computer may be connected to the large computer server through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for efficient logging of event records in an uninterruptible power supply (UPS) array, the system comprising:

a server computer;

a UPS array, that includes a plurality of UPSs, for providing power to the server computer; and an embedded controller coupled to the server computer, wherein the embedded controller includes: a microcontroller control program (MCP), a first storage module, a second storage module that includes a register and a history record store, a serial port controller, a serial bus coupled to the serial port controller and to each of the UPSs, and a message queue data structure coupled to the server computer, the MCP, and to the serial port controller for queuing messages from the server and the MCP to UPSs of the UPS array;

wherein:

the MCP allocates an event log in the first storage module;

the MCP periodically sends status and control messages to the UPSs of the UPS array via the message queue data structure; and the MCP, in response to determining that a message has been received in the message queue from the server computer:

creates a history record in the history record store corresponding to the received message;

determines the duration to complete transmission onto the serial bus of a message that is in process of being transmitted onto the serial bus from the message queue via the serial port controller when the message from the server computer arrives in the message queue;

stores, in the created history record, an entry for the determined duration to complete transmission onto the serial bus of the message that was in process of being transmitted onto the serial bus;

for each message in the message queue that is queued before the message determined to have been received from the server computer, not including the message that was in the process of being transmitted onto the serial bus from the message queue via the serial port controller when the message from the server computer arrived in the message queue, but including the message determined to have been received from the server computer, determines, for each such message, the duration to complete transmission onto the serial bus;

stores, in the created history record, an entry for the determined duration to complete transmission onto the serial bus of each message in the message queue that is queued before the message determined to have been received from the server computer, not including the message that was in the process of being transmitted onto the serial bus from the message queue via the serial port controller when the message from the server computer arrived in the message queue, but including the message determined to have been received from the server computer;

determines a total queue processing time by summing all of the stored durations for the history record entries corresponding to messages in the message queue that were queued before the message determined to have been received from the server computer, not including the message that was in the process of being transmitted onto the serial bus from the message queue via the serial port controller when the message from the server computer arrived in the message queue, but including the message determined to have been received from the server computer, and subtracting from the sum the duration to complete transmission onto the serial bus of the message that was in process of being transmitted onto the serial bus from the message queue via the serial port controller when the message from the server computer arrived in the message queue;

compares the determined total queue processing time to a value in the register corresponding to a previously determined total queue processing time; and in response to determining that the determined total queue processing time is greater than the value in the register corresponding to a previously determined total queue processing time, stores the determined total queue processing time in the register, and logs the created history record into the event log;

whereby only history records indicating a worst case queue processing time are logged into the event log, and whereby the MCP allocates an event log of a size smaller than would be required if all history records were stored in the event log.

2. The system of claim 1, wherein each of the plurality of stored entries includes a message identifier and a message processing time value.

* * * * *